United States Patent [19]

Franzen et al.

[11] Patent Number: 4,895,666

[45] Date of Patent: Jan. 23, 1990

[54] CENTRIFUGE WITH TWO WITHDRAWAL CHAMBERS

[75] Inventors: Paul Franzen, Grevenbroich; Gunther Hultsch, Oberschleissheim, both of Fed. Rep. of Germany

[73] Assignee: Krauss-Maffei Aktiengesellschaft, Münich, Fed. Rep. of Germany

[21] Appl. No.: 323,145

[22] Filed: Mar. 13, 1989

Related U.S. Application Data

[63] Continuation of Ser. No. 80,273, Jul. 31, 1987, abandoned.

[30] Foreign Application Priority Data

Aug. 2, 1986 [DE] Fed. Rep. of Germany ....... 3626314

[51] Int. Cl.[4] ............................................ B01D 21/26

[52] U.S. Cl. .................................. 210/741; 210/117; 210/137; 210/378; 210/744; 210/781; 494/36; 494/56

[58] Field of Search ............... 210/117, 137, 216, 217, 210/360.1, 372–378, 741, 744, 781, 772; 494/36, 56

[56] References Cited

U.S. PATENT DOCUMENTS 1,747,144 2/1930 Roberts ........................... 210/380.1
1,761,593 6/1930 Sharples ............................. 210/772
3,864,256 2/1975 Hultsch et al. ...................... 210/378
4,052,303 10/1977 Hultsch et al. ...................... 210/378
4,101,421 7/1978 Hultsch .............................. 210/378
4,119,542 10/1978 Yamaoka et al. .................. 210/374
4,749,486 6/1988 Yaoxin et al. ....................... 210/374

FOREIGN PATENT DOCUMENTS 1025793 3/1958 Fed. Rep. of Germany ...... 210/217
1151764 7/1963 Fed. Rep. of Germany ...... 210/781
2331196 6/1973 Fed. Rep. of Germany .
2331202 6/1973 Fed. Rep. of Germany .
2603610 1/1976 Fed. Rep. of Germany .

*Primary Examiner*—Richard V. Fisher
*Assistant Examiner*—Joseph Drodge
*Attorney, Agent, or Firm*—Robert J. Koch

[57] ABSTRACT

A centrifuge apparatus and a method of filtration are described. The centrifuge has radial and lateral filtration surfaces and separate discharge chambers for each. The lateral filter is located at an imperforate radial distance from the radial filter. This distance forces the filtration to occur through the radial filter and develop the filter cake rather than pass through the lateral filter which has no developed cake. The use of separate, laterally-disposed withdrawal chambers at different radial heights allows accurate control over the hydraulic filtration forces acting across the filter surfaces.

37 Claims, 5 Drawing Sheets

CENTRIFUGE WITH TWO WITHDRAWAL CHAMBERS

This application is a continuation of application Ser. No. 080,273 filed July 31, 1987, now abandoned.

The invention relates to a centrifuge having lateral and radial filter means, with separate collection and withdrawal chambers.

DESCRIPTION OF THE RELATED TECHNOLOGY

The use of a centrifuge with lateral and radial filters is discussed in DE-OS No. 26 03 610 (U.S. Pat. No. 4,101,421) and DE-OS No. 11 51 764. In DE No. 26 03 610, the radial collection chamber connects with the lateral collection chamber into a mutual lateral withdrawal chamber In DE No. 11 51 764, the lateral collection chamber connects with the radial collection chamber into a radial withdrawal chamber In both of the above apparatus, the lateral filter area ends at the surface of the radial filter, i.e. the filtration surface is continuous between the lateral and radial filters Both filtering areas discharge into a common withdrawal area.

U.S. Pat. No. 1,747,144 teaches the use of a perforated cap ring attached to a centrifuge basket at an inclined angle. The solids on the basket are retained while the steep angle of the cap ring permits liquid to escape across the solids into the unconfined housing. This free discharge does not permit the use of filtrate level to control the filtering pressure.

U.S. Pat No. 1,761,593 teaches a centrifuge having a frustoconical basket with radial filtration and lateral withdrawal. Another embodiment teaches lateral filtration over an imperforate radial plate (i.e. lateral filtration only). A third embodiment uses radial filtration with lateral discharge plus unfiltered lateral overflow to a radial discharge.

The disclosures of U.S. Pat. Nos. 4,101,421; 1,747,144; and 1,761,593 are hereby incorporated by reference.

If a lateral discharge chamber is used (DE-OS No. 26 03 610), the liquid over the filter cake may be removed relatively rapidly at the start of principal filtration. After solids discharge, however, the radial filtration required for the removal of residual liquid in the filter cake (dry centrifuging through the diameter of the centrifuge shell) is relatively slow if the radial filter and the residual layer remaining on it are not regenerated.

Regeneration is accomplished by a reverse flush of the filter medium. In an apparatus such as that of DE No. 11 51 764, liquid is caused to flow from the exterior to the interior of the centrifuge thereby flowing in reverse to the normal flow of filtered liquid. The effective lifetime for filtration in both radial and lateral directions is thereby increased.

SUMMARY OF THE INVENTION

It is therefore the objective of the invention to provide a separation apparatus which makes possible both a short filtering period and a short dry centrifuging period.

This objective is fulfilled by a centrifuge having both lateral and radial filtration with separate annular collection and withdrawal chambers.

The use of two collection and withdrawal chambers affords fluid level control not found in a single collection- and- withdrawal chamber system For example, both withdrawal chambers may be located on the same lateral side of the centrifuge basket, and the lateral filtrate withdrawal chamber may be located closer to the filtering area than the radial filtrate withdrawal chamber. If the closer chamber is also located above (closer to the centrifuge axis of rotation) the outer chamber, hydrostatic pressure across the filter may be controlled by the liquid levels within each withdrawal chamber.

Each withdrawal within a chamber is a pivoting withdrawal conduit which can be used to control hydrostatic pressure across the filter. This conduit is bent to form some angle less than 180°. The level of filtrate within each withdrawal chamber may be controlled by the rotation angle of the withdrawal conduit.

The filtration pressure may be effectively varied to match the filtrate characteristics. If lower radial pressures are desired, the radial filtrate withdrawal liquid height is increased and/or the lateral filtrate withdrawal liquid level is reduced. Conversely, higher radial pressures are achieved by increasing the lateral filtrate liquid height and/or reducing the radial filtrate withdrawal level. A siphon-effect across the filter may be used to add to the filtering pressure and is particularly useful during dry centrifuging (liquid level within the filter cake).

The pressure across the radial filter may be further increased by pressuring a sealed centrifuge housing to 2–4 bar while the collection and withdrawal chambers are open to some lower pressure, e.g. atmospheric. If the lateral filtrate liquid withdrawal level is at maximum height, the pressure across the radial filtering area is maximized. Alternatively, the radial pressure may be minimized by maximizing the radial filtrate withdrawal level. Such operation would be used to permit the filter cake to start forming before large volumes of filtrate are processed.

Fluid heights and filtration control may be further controlled by using valves between each discharge and withdrawal chamber. For example, ball valves and appropriate seats may be disposed between the lateral filtrate collection and withdrawal chambers. Liquid in the withdrawal chamber would exert hydrostatic pressure on the ball and seal the centrifuge from lateral discharge until the feed suspension exerted sufficient pressure on the ball to open the valve.

As the filter cake forms, a layer of relatively sediment-free material forms above the cake. Lateral discharge and filtration facilitates the efficient removal of this material. When valves are used, though, they may be located at the bottom (away from the axis of rotation) of the lateral filter surface. Additional lateral filtration passages may be provided above (closer to the rotation axis) the valves so that the relatively sediment-free liquid may continue to flow laterally as the cake thickness builds up and blocks the valved lateral passages. These additional passages may also have valves if desired.

Between the radial collection chamber and the radial filtrate withdrawal chamber is a passageway. The angle of this passage to the rotation axis will have an effect on the filtration pressure If the passage slopes away from the rotation axis, the radial filtrate forms a hydrostatic suction pressure across the radial filter. A siphon effect (suction) will occur across the filter cake and increase the filtration rate as a result.

A parallel passage between the collection and withdrawal chambers will generate a similar siphon effect.

BRIEF DESCRIPTION OF THE DRAWINGS

The invention will become more apparent from the examples described below and schematically illustrated in the drawings. In the drawings.

DETAILED DESCRIPTION OF THE DRAWINGS

Figure 1:
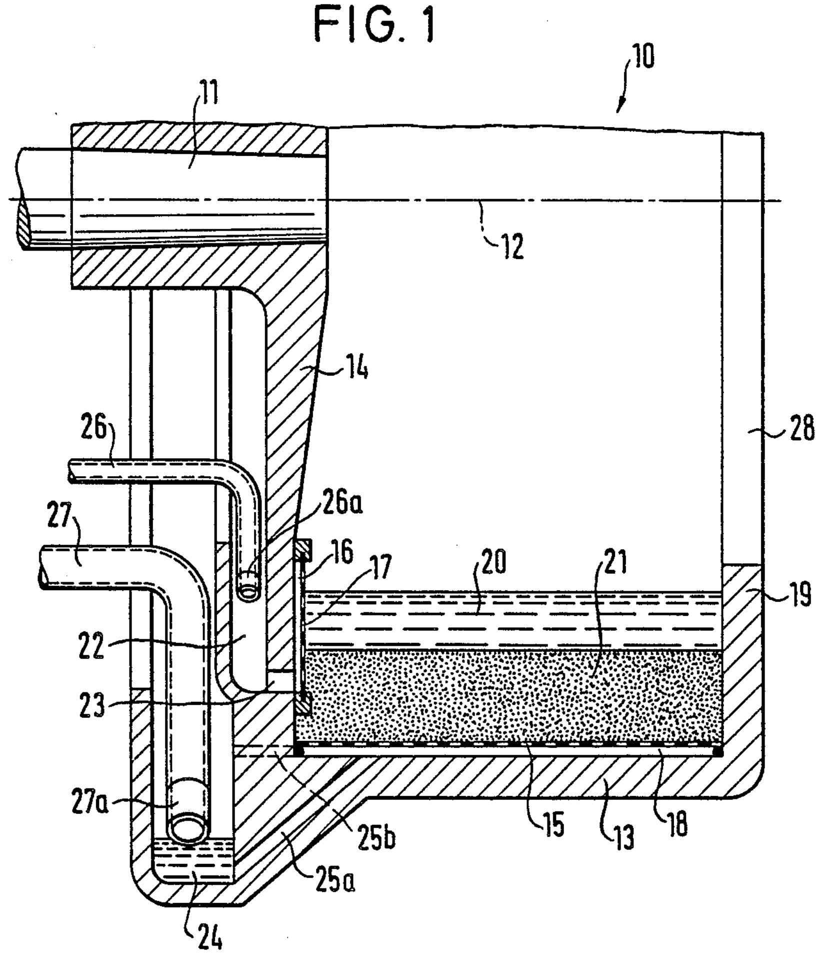
FIG. 1 shows a cross section through the lower half of a centrifuge basket embodiment according to the invention.

In FIG. 1, centrifuge basket 10 is mounted for rotation of shaft 11 around axis 12. This axis may be horizontal. Filters 15 and 17 are installed on centrifuge basket shell 13 and basket side 14, respectively. Space between basket side 14 and filter 17 forms lateral filtrate collecting chamber 16. Collector chamber 18 for radial filtrate is located between basket shell 13 and filter 15.

On the side located opposite basket side 14, the centrifuge basket 10 has an opening 28 for the entry of suspended material. After filtration, solids may be discharged through opening 28.

Figure 2:
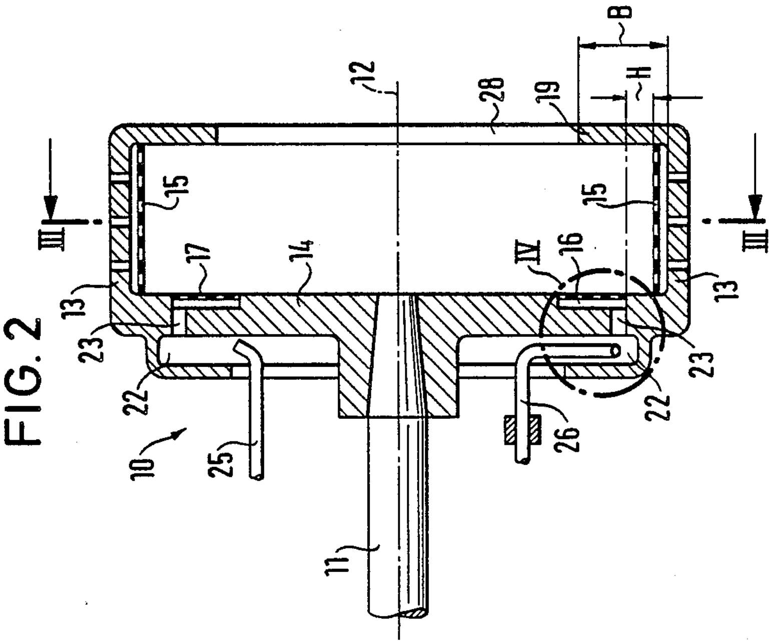
FIG. 2 represents a section through another basket according to the invention For the sake of simplicity, the radial filtrate collection and withdrawal chambers for the basket are omitted.

At the start of filtration, the suspension of filtrate liquid 20 and solids 21 is filled almost to height B (FIG. 2) of rim 19. Rim 19 is located between basket shell 13 and basket opening 28. Filling occurs while centrifuge basket 10 is being rotated at a high rpm around axis 12. As the filtration continues, relatively sediment-free filtrate liquid 20 gathers above solids 21 and flows through lateral filter 17 into collector chamber 16 located behind it. Filtrate liquid 20 passing through solids 21 (filter cake) flows through filter 15 into collector chamber 18. With fine sediments, the path of filtrate 20 through the growing filter cake rapidly becomes more difficult (higher pressure drop) as the cake becomes thicker.

From the above sequence, the only effective contact between filter 17 and filtrate liquid 20 is after the cake has formed and the liquid separated to a substantial extent. If filter 17 is too close to filter 15, there is a risk that filtration will start through lateral filter 17 during the filling and cake growth periods. This would start to form a cake over filter 17 and reduce its effectiveness later.

To avoid this problem, lateral filter 17 is located above radial filter 15 at an imperforate distance to permit cake formation on radial filter 15 rather than lateral filter 17. Such a positioning is shown in FIG. 1 and is particularly effective when collector chamber 16 is closed off while basket 10 is filled with the suspension feed. (This closing is described in more detail below). The outer edge of lateral filter 17 may be positioned at a distance "H" (FIG. 2) from radial filter 15 within approximately 20% to approximately 60% of height B of rim 19.

In the embodiment of FIG. 1, annular lateral filtrate withdrawal chamber 22 and annular radial filtrate withdrawal chamber 24 are located adjacent basket side 14. Lateral filtrate withdrawal chamber 22 is located closer to basket side 14 than radial filtrate withdrawal chamber 24 such that the bottom of chamber 22 is located above (closer to the rotation axis) the bottom of chamber 24.

The term "above" is used herein to indicate a relationship closer to the axis of rotation 12 of basket 10. "Below" indicates the reverse relationship.

Figure 4:
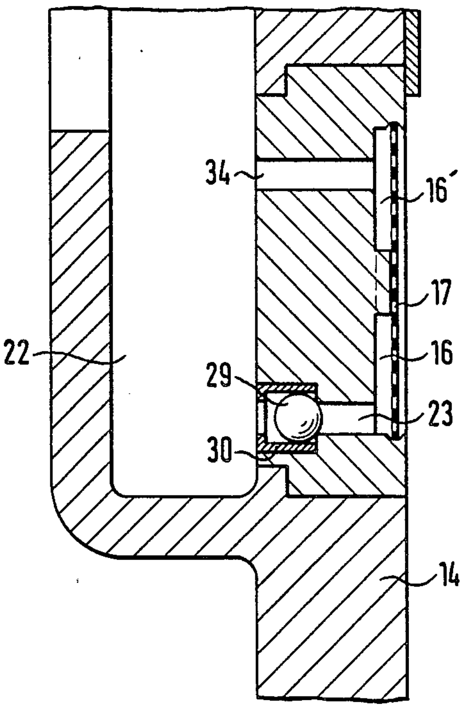
FIG. 4 depicts another embodiment of lateral collection and withdrawal chambers which would be located in the centrifuge of FIG. 2 by dash-and-dot circle IV.

The bottom of lateral filtrate withdrawal chamber 22 is connected by bore 23 in basket side 14 with lateral filtrate collector chamber 16. As shown in FIG. 4, within bore 23 is a valve with a valve ball 29 and a valve seat 30 to close off collector chamber 16 during the filling of basket 10 with suspension. The valve 29/30 may be hydrostatically controlled by sealing liquid in annular lateral filtrate withdrawal chamber 22. When this sealing liquid is above the height of liquid 20 (before or after separation), the hydrostatic pressure against filter 17 is higher than the hydrostatic pressure of the suspension and the valve closes chamber 16 from chamber 22.

As seen further from FIG. 4, between lateral filtrate withdrawal chamber 22 and lateral filtrate collector chamber 16 are bores 34 through basket side 14. Bores 34 are at a level whereby the uppermost layer of practively sediment-free filtrate liquid 20 (FIG. 1) may flow through filter 17 into chamber 22. These additional bores 34, open at locations into chamber 22 above bore 23 containing valve 29/30. Bore 23 opens at the bottom of chamber 16 into chamber 22. Chambers 16 and 16' may be the same or different as indicated by the dashed line.

Withdrawal conduits 26 and 27 empty withdrawal chambers 22 and 24, respectively. Conduit 26 is mounted parallel to axis 12 and pivots to position mouth piece 26a within withdrawal chamber 22. The length of conduit 26 within chamber 22 may be varied in a manner clear to one in this art from this disclosure.

It is also possible to introduce liquid through the withdrawal conduit 26 into withdrawal chamber 22. A more preferred method is to provide a separate liquid inlet pipe 25 (FIG. 2) for this purpose. The axis of inlet pipe 25 is located parallel with rotational axis 12 and projects into filtrate withdrawal chamber 22. The liquid introduced through inlet pipe 25 may be the valve sealing liquid mentioned above or a flushing liquid. From withdrawal chamber 22, the flushing liquid passes through open bore 23 and against filter 17 to flush filter 17. Flushing occurs following the completion of filtering and the filter cake removal.

Radial filtrate withdrawal chamber 24 is connected through oblique (not parallel) bore 25a in basket shell 13 or, as shown by the broken line, through parallel bore 25b in basket bottom 14. Radial filtrate collector chamber 18 is located below radial filter 15. Parallel bore 25b is essentially parallel to basket shell 13 and/or axis 12 and opens into radial filtrate withdrawal chamber 24 relatively high above the bottom of chamber 24. Alternatively, oblique bore 25a opens into the bottom of chamber 24. In a further embodiment, withdrawal chamber 24 may be positioned so that bore 25b opens at the bottom of chamber 24.

By positioning chamber 24 as shown in FIG. 1, a siphon is formed. Oblique bore 25a extends at an angle of 30 to 60° relative to rotational axis 12 and opens at the bottom of radial filtrate withdrawal chamber 24. In order to generate the siphon effect, liquid level in chamber 24 completely covers the opening of oblique bore 25*a*. The radial difference between the withdrawal chamber liquid level and the surface of filter 15 acts as an additional pressure difference to accelerate filtration during dry centrifuging.

Dry centrifuging begins as soon as the level of filtration liquid 20 enters the filter cake (solids layer 21). This entrance takes place after filtrate liquid 20 has been separated into lateral filtrate through lateral filter 17 and shell filtrate (in a significantly lesser volume than the lateral filtrate) through radial filter 15. The radial filtrate liquid discharged during dry centrifuging gathers in collection chamber 18 and moves to withdrawal chamber 24. To empty chamber 24 and to control the liquid level essential for the siphon effect, withdrawal tube 27 is mounted to pivot within chamber 24. The mounting of tube 27 is essentially the same as withdrawal tube 26. In a manner similar to lateral filtrate withdrawal chamber 22, a flushing liquid may be introduced through tube 27 and mouthpiece 27*a* into chamber 24 after completion of the filter process to reverse flush radial filter 15.

The structural combination of separate lateral and radial withdrawal chambers 22 and 24 makes possible the optimal operation of the filtering process with minimal times for principal filtration (removal of the liquid 20) and dry centrifugation. Experiments indicate that the use of a centrifuge basket according to the invention reduces the principal filtration period from 7500 s. (conventional centrifuge) to 250 s. with a filter cake of high resistance.

Figure 3:
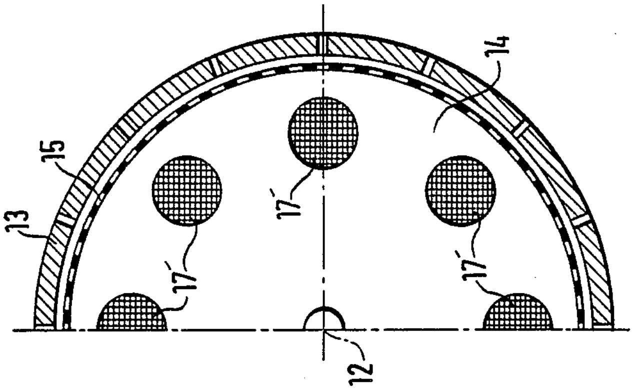
FIG. 3 is a section on line III—III in FIG. 2.
Figure 6:
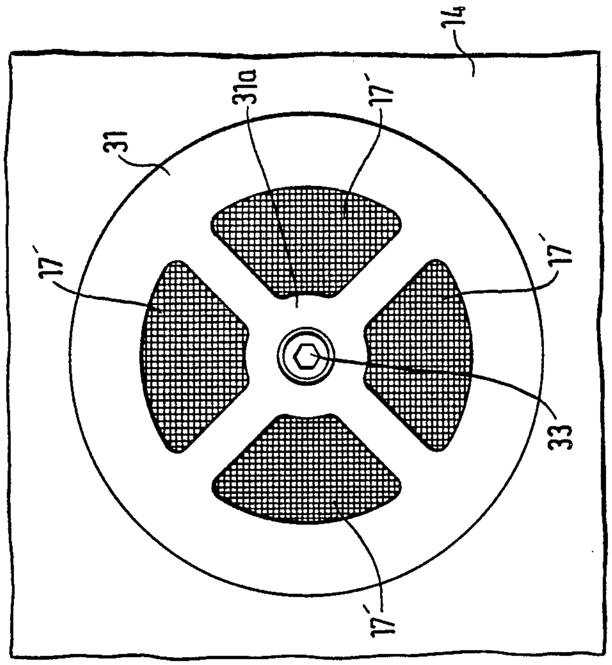
FIGS. 6 and 8 illustrate top elevation views of the filters according to FIGS. 5 and 7.
Figure 5:
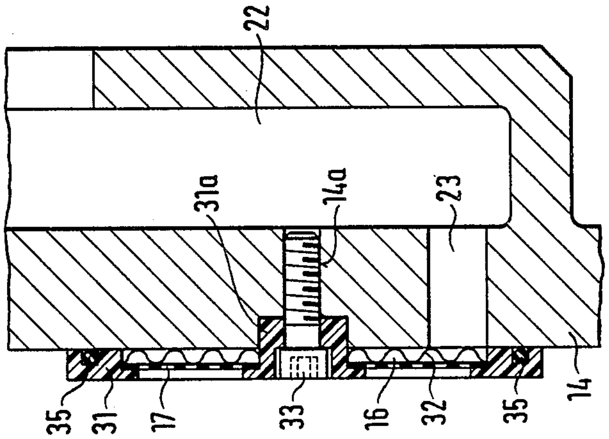
FIGS. 5 and 7 are detailed sections through lateral filter embodiments.

As shown in FIGS. 3 to 6, filter 17 is preferably in the form of rounds. In FIG. 3 the filtering areas are located in a uniform distribution around basket side 14. As shown in FIGS. 5 and 6, a supporting frame 31 is laid out in the shape of a wheel with a center hub 31*a*. A screw 33 is passed through hub 31*a* and screwed into threaded bore 14*a* of basket side 14. Supporting frame 31 is circumferentially sealed against basket side 14 by an inserted gasket 35. The frame structure of supporting frame 31 forms a plurality of segment windows (four windows in FIG. 6) into which filters 17' are set. The shape of each filter 17' corresponds to the shape of each segment window. Between each shaped filter 17' and the surface of the basket side 14, a corrugated support screen is provided to limit the swelling of the filter 17' during reverse flushing and also to assure the unimpaired collection and discharge of lateral filtrate into withdrawal chamber 22. This construction is a filter 17 "round".

Figure 8:
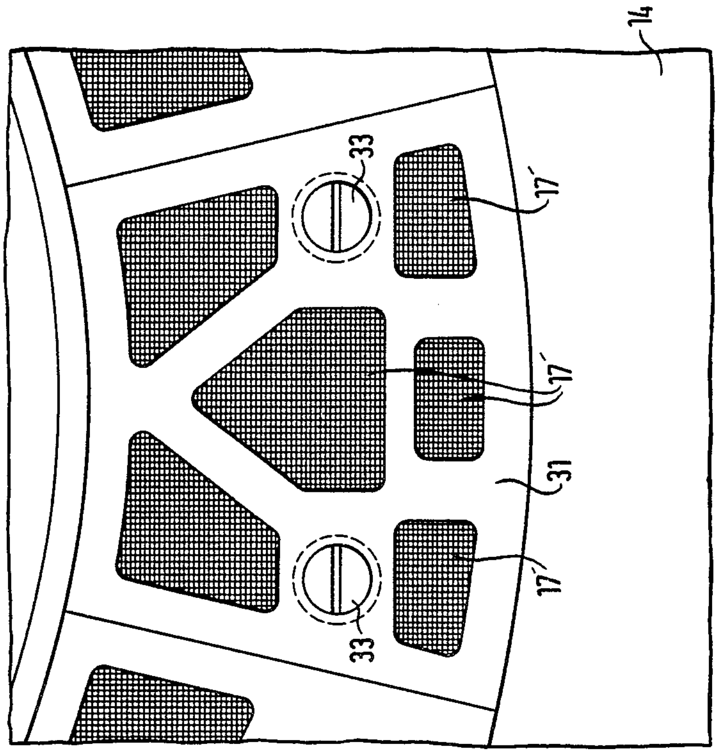
Figure 7:
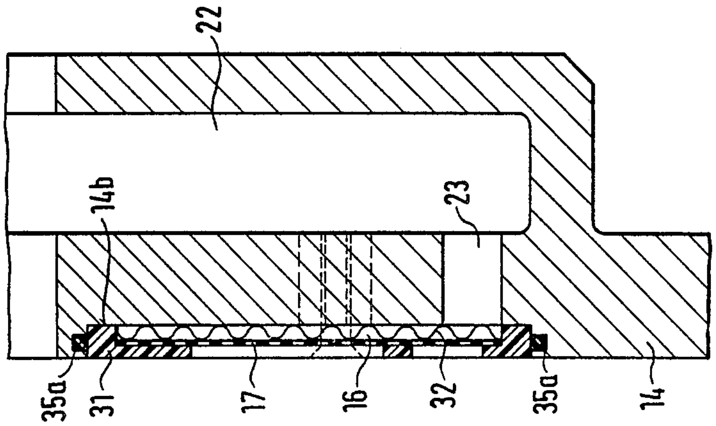

A further configuration of filter 17 is illustrated in FIGS. 7 and 8. Here again, support frame 31 is made of a castable or injection moldable plastic and comprises segmental recesses into which the filters 17' are inserted and supported in turn by support screens 32. This is similar to the filter rounds discussed above in reference to FIGS. 5 and 6. To mount the support frames 31 adjacently in an annular zone, support frames 31 are set flush with the surface of the basket side 14 into an annular groove 14*b* formed in basket side 14. Fastening screws 33 pass through each support frame 31 in widened locations and are screwed into associated threaded bores in basket side 14. Support frames 31 are circumferentially sealed off by sealing beads 35*a* inserted between the frontal surfaces of support frames 31 and the flanks of grooves 14*b*. The use of such sealing beads may be avoided if the support frames 31 are made of a highly elastic material and are made self-sealing.

The filters 17' in the segments of the support frames 31 may be dimensioned according to a rule of thumb by which the total surface of the filter 17 relative to the total surface of the basket shell 13 is within a range of approximately 1:20 to approximately 1:60.

It is of course understood that the drawings and examples discussed are merely exemplary of the scope of the invention. Variations within this invention will be apparent to others within this art after reading this specification and understanding the drawings.

We claim:

1. Apparatus useful for separating solids from liquids said apparatus comprising:

- a centrifuge basket having an axis of rotation, a radial surface, and a lateral surface;
- a radial filter attached to said radial surface and oriented to collect separated solids on a feed side and pass radial-filtrate to a collection side;
- an annular radial-filtrate withdrawal chamber for removing said radial-filtrate from said apparatus;
- a lateral filter attached to said lateral surface and oriented to collect separated solids on a feed side and pass lateral-filtrate to a collection side;
- an annular lateral-filtrate withdrawal chamber separate from said radial-filtrate withdrawal chamber and for removing said lateral-filtrate from said apparatus; and
- wherein said radial and lateral-filtrate withdrawal chambers are laterally located with respect to said radial and lateral filters, respectively.

2. Apparatus according to claim 1, further comprising a lateral-filtrate withdrawal conduit in communication with said lateral-filtrate withdrawal chamber and a radial-filtrate withdrawal conduit in communication with said radial-filtrate withdrawal chamber wherein said lateral-filtrate withdrawal conduit is independent and separate from said radial-filtrate withdrawal conduit.

3. Apparatus according to claim 2, wherein at least one of said withdrawal conduits comprises a bent pivoting striping tube.

4. Apparatus according to claim 2, further comprising means for introducing a flushing liquid into at least one of the withdrawal chambers.

5. Apparatus according to claim 4 wherein said means for introducing a flushing liquid is a conduit which is distinct from an associated withdrawal conduit.

6. Apparatus according to claim 1, wherein each of said withdrawal chambers has a radial length as measured from a chamber bottom to the axis of rotation of said centrifuge basket and wherein the radial length of said lateral-filtrate withdrawal chamber is less than the radial length of said radial-filtrate withdrawal chamber.

7. Apparatus according to claim 1, further comprising a radial-filtrate collection chamber in a fluid communication path between said radial filter and said radial-filtrate withdrawal chamber.

8. Apparatus according to claim 7, further comprising a radial-filtrate passageway connecting said radial-filtrate collection chamber and said radial-filtrate withdrawal chamber.

9. Apparatus according to claim 8, wherein said radial-filtrate passageway connects the chambers by extending parallel to said axis of rotation of said centrifuge basket.

10. Apparatus according to claim 8, wherein said radial filtrate passageway connects the chambers by extending in an angle that is not parallel to said axis of rotation of said centrifuge basket.

11. Apparatus according to claim 10, wherein said angle is sufficient to generate a suction pressure across said radial filter when filtrate is in said radial filtrate passageway.

12. Apparatus according to claim 11, wherein said angle is within 30°–60° from said axis of rotation.

13. Apparatus according to claim 1, further comprising a lateral-filtrate collection chamber in a fluid communication path between said lateral filter and said lateral filtrate withdrawal chamber.

14. Apparatus according to claim 13, further comprising a lateral-filtrate passageway connecting said lateral-filtrate collection chamber and said lateral-filtrate withdrawal chamber.

15. Apparatus according to claim 14, further comprising a valve within said lateral filtrate passageway.

16. Apparatus according to claim 15, wherein said valve has a structure that closes said lateral filtrate-passageway when pressure on said valve from said lateral-filtrate withdrawal chamber is higher than pressure on said valve from said lateral-filtrate collector chamber.

17. Apparatus according to claim 1, wherein said lateral filter and said radial filter are separated by an imperforate radial distance.

18. Apparatus according to claim 1, wherein a ratio of radial filter area to lateral filter area is between 20:1 and 60:1.

19. Apparatus according to claim 1, lateral filter comprises a support frame and a plurality of filter segments.

20. Apparatus according to claim 1, wherein both of the withdrawal chambers are adjacent to each other.

21. Apparatus according to claim 20, wherein said withdrawal chambers are on a centrifuge side containing lateral filters.

22. A process for the centrifugal separation of solids from a feed suspension, said process comprising:

feeding said suspension to a centrifuge basket having an axis of rotation, a radial filter, and a lateral filter;

filtering said suspension through said radial filter and forming a filter cake comprising solids from said suspension, said filter cake forming on a radial filtration side of said radial filter;

collecting radial-filtrate in a radial-filtrate collection space after passage through said radial filter;

collecting lateral-filtrate in a lateral-filtrate collection space after passage through said lateral filter;

lateral transferring said radial-filtrate from said radial-filtrate collection space to a radial-filtrate withdrawal chamber;

laterally transferring said lateral-filtrate from said lateral-filtrate collection space to a lateral-filtrate withdrawal chamber which is separate from said radial-filtrate withdrawal chamber and without admixture of said radial-filtrate and said lateral-filtrate; and independently withdrawing at least one of said lateral-filtrate and said radial-filtrate from their respective withdrawal chambers.

23. A process as in claim 22, wherein filter cake formation on said lateral filter is prevented by blocking filtrate flow through said lateral filter until a layer of substantially sediment-free liquid forms above said filter cake and then unblocking filtrate flow through said lateral filter.

24. A process as in claim 23, wherein said blocking of filtrate flow is accomplished by closing a valve between said lateral-filtrate collection space and said lateral-filtrate withdrawal chamber.

25. A process as in claim 24, wherein said valve closes in response to hydrostatic pressure from said lateral-filtrate withdrawal chamber.

26. A process as in claim 25, comprising the increasing of hydrostatic pressure in said lateral-filtrate withdrawal chamber by the step of:

introducing liquid into said lateral-filtrate withdrawal chamber through an inlet conduit discharging into said chamber opposite a collection space side of the valve until sufficient liquid is introduced to overcome pressure on said valve from said collection space side.

27. A process as in claim 22, further comprising exerting a suction pressure across said radial filter by transferring said radial-filtrate from said radial-filtrate collection space to said radial-filtrate withdrawal chamber.

28. A process as in claim 27, wherein said transferring said radial-filtrate is in a direction that is at an angle to said axis of rotation of said centrifuge basket and is not parallel to said axis of rotation.

29. A process as in claim 28, wherein said transferring is at an angle between 30–60 degrees declination from said axis of rotation.

30. A process as in claim 22, wherein said transferring said radial-filtrate to said radial-filtrate withdrawal chamber is in a direction parallel to said axis of rotation of said centrifuge basket.

31. A process as in claim 22, further comprising pressurizing said radial filtration side relative to said radial-filtrate withdrawal chamber for assisting the suspension filtration.

32. A process as in claim 31, wherein said pressurizing comprises a superatmospheric pressure.

33. A process as in claim 32, wherein said superatmospheric pressure is within 2–4 bar.

34. A process as in claim 22, further comprising the step of preventing formation of a filter cake on said lateral filter by locating said lateral filter at an imperforate radial distance from said radial filter.

35. A process as in claim 22, wherein the independent withdrawal of at least one of said lateral filtrate and said radial-filtrate from their respective withdrawal chambers is by at least one adjustable independently rotationally bent withdrawal conduit in radially adjustable communication with filtrate in the withdrawal chamber.

36. A process as in claim 35, comprising the step of rotating said at least one bent withdrawal conduit to place a withdrawal opening in said conduit in communication with at least one of said radial filtrate and said lateral filtrate.

37. A process as in claim 22, comprising the step of controlling the filtering pressure across at least one of said lateral filter and said radial filter by adjusting filtrate liquid level in at least one of said lateral filtrate withdrawal chamber and said radial-filtrate withdrawal chamber.

* * * * *